United States Patent
Roy et al.

(10) Patent No.: US 9,178,705 B2
(45) Date of Patent: Nov. 3, 2015

(54) METHOD AND SYSTEM FOR STATELESS VALIDATION

(75) Inventors: Patrick Roy, Gatineau (CA); Robert Desbiens, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 2699 days.

(21) Appl. No.: 11/787,268

(22) Filed: Apr. 13, 2007

(65) Prior Publication Data

US 2008/0256612 A1 Oct. 16, 2008

(51) Int. Cl.
*H04L 9/32* (2006.01)
*H04L 29/06* (2006.01)

(52) U.S. Cl.
CPC .............. *H04L 9/3226* (2013.01); *H04L 63/08* (2013.01); *H04L 63/12* (2013.01); *H04L 63/126* (2013.01)

(58) Field of Classification Search
USPC ........................................................ 726/5, 10
See application file for complete search history.

(56) References Cited

U.S. PATENT DOCUMENTS

| | | | |
|---|---|---|---|
| 6,311,194 B1 | 10/2001 | Sheth et al. | |
| 6,385,642 B1 * | 5/2002 | Chlan et al. | 709/203 |
| 6,826,695 B1 | 11/2004 | House et al. | |
| 6,874,025 B2 | 3/2005 | Hoogenboom et al. | |
| 6,915,454 B1 | 7/2005 | Moore et al. | |
| 7,143,111 B2 | 11/2006 | Yamada | |
| 7,165,249 B2 | 1/2007 | Potter et al. | |
| 7,203,928 B2 | 4/2007 | Mandava et al. | |
| 7,254,581 B2 | 8/2007 | Johnson et al. | |
| 7,290,288 B2 | 10/2007 | Gregg et al. | |
| 7,296,297 B2 | 11/2007 | Kirkpatrick et al. | |
| 7,340,714 B2 | 3/2008 | Upton | |
| 7,366,892 B2 | 4/2008 | Spaur et al. | |
| 7,424,616 B1 | 9/2008 | Brandenburg et al. | |
| 7,451,352 B1 | 11/2008 | Moore et al. | |
| 7,472,413 B1 | 12/2008 | Mowshowitz | |
| 2003/0037236 A1 | 2/2003 | Simon et al. | |
| 2004/0189708 A1 | 9/2004 | Larcheveque et al. | |
| 2005/0125438 A1 | 6/2005 | Krishnaswamy et al. | |
| 2005/0228984 A1 | 10/2005 | Edery et al. | |

OTHER PUBLICATIONS

CERT, "Understanding Malicious Content Mitigation for Web Developers," CERT Coordination Center, Feb. 2000, http://www.cert.org/tech_tips/malicious_code_mitiagation.html and http://www.cert.org/tech_tips/malicouis_-code_FAQ.html, pp. 1-9.

"CERT Advisory CA—Feb. 2000 Malicious HTML Tags Embedded in Client Web Requests," CERT Coordination Center, Feb. 2000, http://www.cert.org/advisories/CA-20-00-02.html, pp. 1-7.

(Continued)

*Primary Examiner* — Gilberto Barron, Jr.
*Assistant Examiner* — Devin Almeida
(74) *Attorney, Agent, or Firm* — Shumaker & Sieffert, P.A.

(57) ABSTRACT

A method of validating parameters of a request from a Web client to a Web application. The validation rules are sent to a Web client, together with a response to a Web client. The parameters in a response are updated by the Web client. The updated parameters are sent in a subsequent request to the Web client, along with the validation rules. The updated parameters are validated using the validation rules in the request, thus achieving stateless validation. The validation rules are preferably digitally signed.

20 Claims, 7 Drawing Sheets

(56) References Cited

OTHER PUBLICATIONS

Struts, The Apache Software Foundation, 2000-2004, http://struts.apache.org/userGuide/dev_validator.html, pp. 1-18.

"A survey of Trust in Internet Applications"; Gradison et al.; IEEE Communications Surveys and Tutorials, Fourth Quarter 2000; Jan. 24, 2001; [http://www.comsoc.org/pubs/suveys/][Sectoin 6.4], pp. 1-28.

"Specifying and Enforcing Application-Level Web Security Policies"; Scott et al. IEEE Transactions on Knowledge and Data Engineering, vol. 15, No. 4, Jul./Aug. 2003 [whole document]; pp. 771-783.

"Nedgty: Web Services Firewall"; Bebawy et al.; Proceedings of the IEEE International Conference on Web Services, 2005 (ICWS 2005) Jul. 15, 2005 [Section 3], [Section 4], pp. 5 pp.

"Warnings for Disjoint Knowledge Omission in Ontologies," Qadir, M.A.; Noshairwan, W.; Internet and Web Applications and Services, 2007. ICIW '07, Second International Conference on May 13-19, 2007 pp. 45-45 Digital Object Identifier 10.1109/ICIW.2007.69.

* cited by examiner

METHOD AND SYSTEM FOR STATELESS VALIDATION

FIELD

The present disclosure relates to Web applications. More specifically, the present disclosure relates to Web application security.

BACKGROUND

The statements in this section merely provide background information related to the present disclosure and may not constitute prior art.

The Internet is by far the largest, most extensive publicly available network of interconnected computer networks that transmit data by packet switching using a standardized Internet Protocol (IP) and many other protocols. The Internet has become an extremely popular source of virtually all kinds of information. Increasingly sophisticated computers, software, and networking technology have made Internet access relatively straightforward for end users. Applications such as electronic mail, online chat and Web client allow the users to access and exchange information almost instantaneously.

The World Wide Web (WWW) is one of the most popular means used for retrieving information over the Internet. The WWW can cope with many types of data which may be stored on computers, and is used with an Internet connection and a Web client. The WWW is made up of millions of interconnected pages or documents which can be displayed on a computer or other interface. Each page may have connections to other pages which may be stored on any computer connected to the Internet. Uniform Resource Identifiers (URI) is an identifying system in WWW, and typically consists of three parts: the transfer format (also known as the protocol type), the host name of the machine which holds the file (may also be referred to as the Web server name) and the path name to the file. URIs are also referred as Universal Resource Locators (URLs). The transfer format for standard Web pages is Hypertext Transfer Protocol (HTTP). Hyper Text Markup Language (HTML) is a method of encoding the information so it can be displayed on a variety of devices.

Web applications are engines that create Web pages from application logic, stored data, and user input. Web applications often preserve user state across sessions. Web applications do not require software to be installed in the client environment. Web applications make use of standard Web browser components to view server-side built pages. Web application can also deliver services through programmatic interface like Software Development Kits (SDKs).

HTTP is generally the underlying transactional protocol for transferring files (text, graphic images, sound, video, and other multimedia files) between Web clients and servers. HTTP defines how messages are formatted and transmitted, and what actions Web servers and Web client browsers should take in response to various commands. A Web browser as an HTTP client, typically initiates a request by establishing a TCP/IP connection to a particular port on a remote host. An HTTP server monitoring that port waits for the client to send a request string. Upon receiving the request string (and message, if any), the server may complete the protocol by sending back a response string, and a message of its own, in the form of the requested file, an error message, or any other information. The HTTP server can take the form of a Web server with gateway components to process requests. A gateway is a custom Web server module or plug-in created to process requests, and generally is the first point of contact for a Web application. The term "gateway" is intended to include any gateways known to a person skilled in the art, for example, CGI; ISAPI for the Microsoft Internet Information Services (IIS) Web server; Apache Web server module, or a Java servlet.

Web pages regularly refer to pages on other servers, whose selection will elicit additional transfer requests. When the browser user enters file requests by either "opening" a Web file by typing in a Uniform Resource Locator (URL), or clicking on a hypertext link, the browser builds an HTTP request. In actual applications, Web clients may need to be distinguished and authenticated, or a session which holds a state across a plurality of HTTP protocols may need to be maintained by using "state" called cookie.

Web applications incur a security risk by accepting user input in their application logic. A common strategy for protecting Web applications against malicious data is for Web applications to verify the data they receive prior to processing it. The act of checking data entering a Web application for processing is called input validation. Web application entry point, for example, a Web application firewall typically examine incoming request, apply generic security rules, and reject requests that fail to comply with these rules. Input validation includes accepting only data deemed acceptable to a Web application, or rejecting data that could be offensive to the Web application. So as to not reject legitimate data, the input validation process requires a great deal of knowledge about the Web application behavior. Failure in doing so may impair the Web application's functionality. Further, when an entry point is shared by multiple Web applications, the validation logic implementation is required to account for applications having different validation logics for data in the same context. Similar requirement exists for an application composed of multiple components.

A method and system to build rich and yet simple to define rules applied by a validation engine has been described in U.S. application Ser. No. 11/187,268, titled "Rich Web Application Input Validation", the entirety of which is hereby incorporated by reference. The capabilities of the rules allow tight validation of complex Web application data without the need for customized validation code. The syntax of the rules is adapted for human handling, either by using human readable rule definitions, or by manipulating a tool. The syntax of the rules helps to write, to verify correctness, to ensure completeness, and to facilitate updates of the rules.

Validation rules may be numbered in thousands for a large business Web application. One approach to simplify the rule set of the large Web applications is the dynamic generation of rules. For example, a Web application constructing a page with integer parameters can specify that the values for these parameters should be of type integer. The disadvantage of this approach is that the size of the validation rules may become an issue for applications with memory constraints. In other words, in extreme case it is not practical for the entry point to have knowledge of all the validation rules. Another limitation for the management of dynamically generated rules is the distributed nature of many applications. To handle large load of requests, entry points can be distributed onto several hosts. Maintaining the list of all validation rules on each entry point of a distributed system may not be optimal.

It is therefore desirable to provide stateless validation rules. Stateless is intended to indicate that the validation rules are sent to the client in a response then back to the server in a request, i.e., in a round trip instead of being stored server-side, for example at an entry point. The validation rule for data part of a request is also part of the request being validated. Impromptu components added to installed Web applications can also benefit from stateless validation. With a proper framework in place, the Web application can have an entry point validate their data without registering their rules to the entry point.

US Application 20030037236 teaches a technology for automated input validation filters generation to allow a user external to the Web application to easily define validation filters.

US Application 20030037236 does not teach the broadening of the validation capabilities of the input engine to perform validation based on the validation rules in the request. In addition, the relations used in defining assumptions on parameters follow the traditional input validation model as described by the list of validation types in the STRUTS framework. The inclusion of conjunctions and disjunctions is not sufficient to create the validation rules. Capabilities to ease manual writing of rules are introduced as manual writing of rules is undesirable. US Application 20030037236 does not give the rule writers with intimate knowledge of the Web application who seek to achieve the most secure validation the capabilities to address complex Web applications validation requirements as encountered in Business Intelligence Web applications.

US Application 20040189708 teaches a system and method for validating entry of data into a structured data file in real-time. The system and method also described a real-time validation tool that enables a developer to create custom validation rules. These custom validation rules can include preset validation rules. The system and method validates data as to be safely stored in hierarchical structures thus easing the user experience by not generating misleading errors. However, US Application 20040189708 does not introduce new validation capabilities to validate input data against malicious users trying to exploit security vulnerabilities, it only provides a list of preset validation rules matching a sub-set of the STRUTs framework list. These preset validation rules and the custom rules failed to address the validation requirements of complex Web Applications like business intelligence Web applications. More specifically, US Application 20040189708 does not validate input data against malicious users based on the validation rules embedded in the requests.

One of the benefits of embedding the validation rules in the response and the subsequent requests is the flexibility the Web applications have to validate a request. An application firewall can be used to process the embedded rules but a component can choose to bypass the application firewall and invoke the validation itself. As long as the data is validated before being processed, security is not compromised. Because data can go through transformations while being dispatched within an application, it may be easier to implement validation rules for data before being processed by a component of the application, because data ready to be processed is often in a simpler form.

Therefore, there is a need for a method and system that provide a stateless validation of the request. As the validation rules in a stateless validation are sent to an untrusted client, and used by the Web application upon return, the method and system need to ensure the authenticity, and the integrity of the validation rules. The term untrusted client is intended to include a client who may submit malicious requests to exploit an application security vulnerability. The authenticity check will enforce that the received validation rules come from a trusted server. The integrity check will verify that the validation rules have not been modified by the untrusted client.

SUMMARY

According to one aspect of the present disclosure there is provided a method of validating request data transmitted between an untrusted client and a server based on characteristics of a previous response comprising the steps of: building a response with a validation rule, the response having a characteristic indicative of a constraint to be applied to subsequent request data, the validation rule including the constraint; receiving the response by the untrusted client; building the subsequent request, the subsequent request including the subsequent request data and the validation rule; sending the subsequent request to the server; receiving the subsequent request at the server; and validating the subsequent request data using the validation rule.

According to another aspect of the present disclosure there is provided a system for validating request data transmitted between an untrusted client and a server based on characteristics of a previous response comprising: means for building a response with a validation rule, the response having a characteristic indicative of constraints to be applied to subsequent request data, the validation rule including the constraints; means for receiving the response by the untrusted client; means for building the subsequent request, the subsequent request including the subsequent request data and the validation rule; means for sending the subsequent request to the server; means for receiving the subsequent request at the server; and means for validating the subsequent request data using the validation rule.

According to another aspect of the present disclosure there is provided a storage medium readable by a computer encoding a computer program for execution by the computer to carry out a method for validating request data transmitted between an untrusted client and a server based on characteristics of a previous response comprising, the computer program comprising: code means for building a response with a validation rule, the response having a characteristic indicative of constraints to be applied to subsequent request data, the validation rule including the constraints; code means for receiving the response by the untrusted client; code means for building the subsequent request, the subsequent request including the subsequent request data and the validation rule; code means for sending the subsequent request to the server; code means for receiving the subsequent request at the server; and code means for validating the subsequent request data using the validation rule.

This summary of the disclosure does not necessarily describe all features of the disclosure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

The disclosure and the illustrated embodiments may be better understood, and the numerous objects, advantages, and features of the present disclosure and illustrated embodiments will become apparent to those skilled in the art by reference to the accompanying drawings. In the drawings, like reference numerals refer to like parts throughout the various views of the non-limiting and non-exhaustive embodiments of the present disclosure, and wherein.

Figure 7:
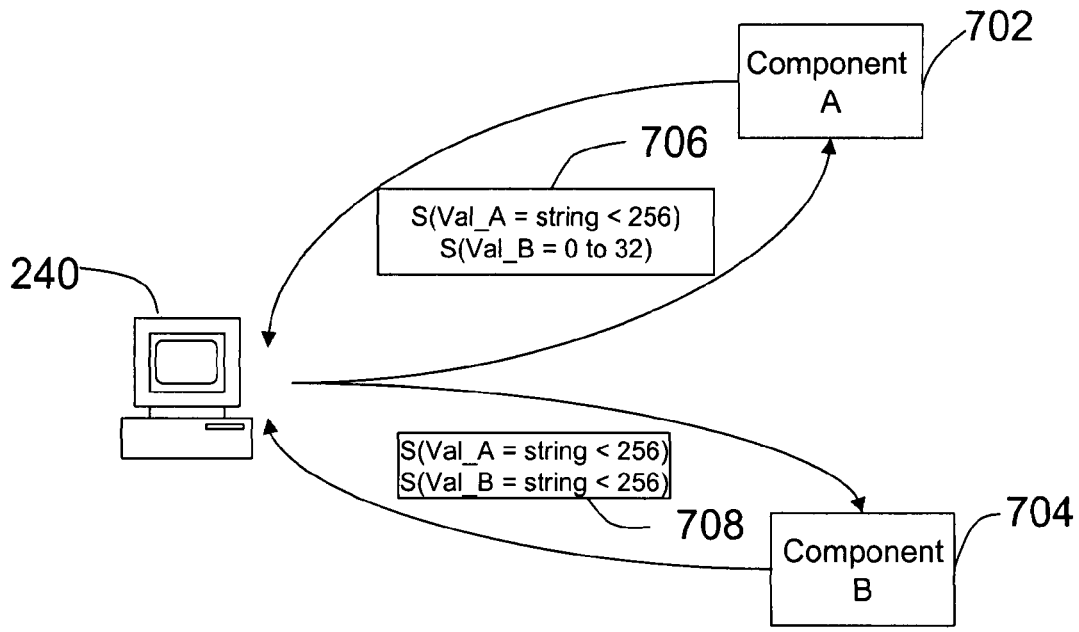
Figure 7:
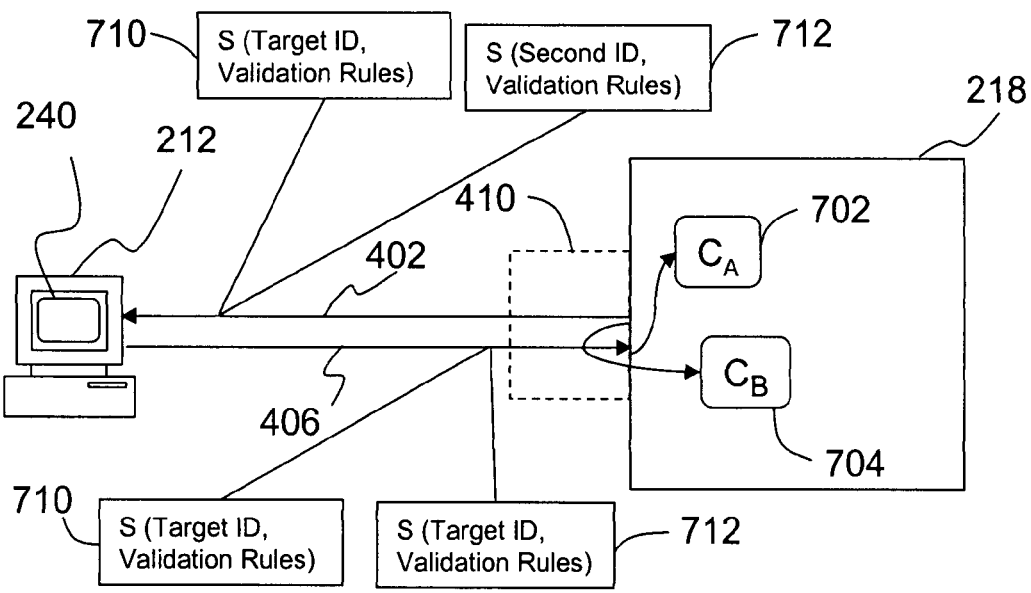
Figure 8:
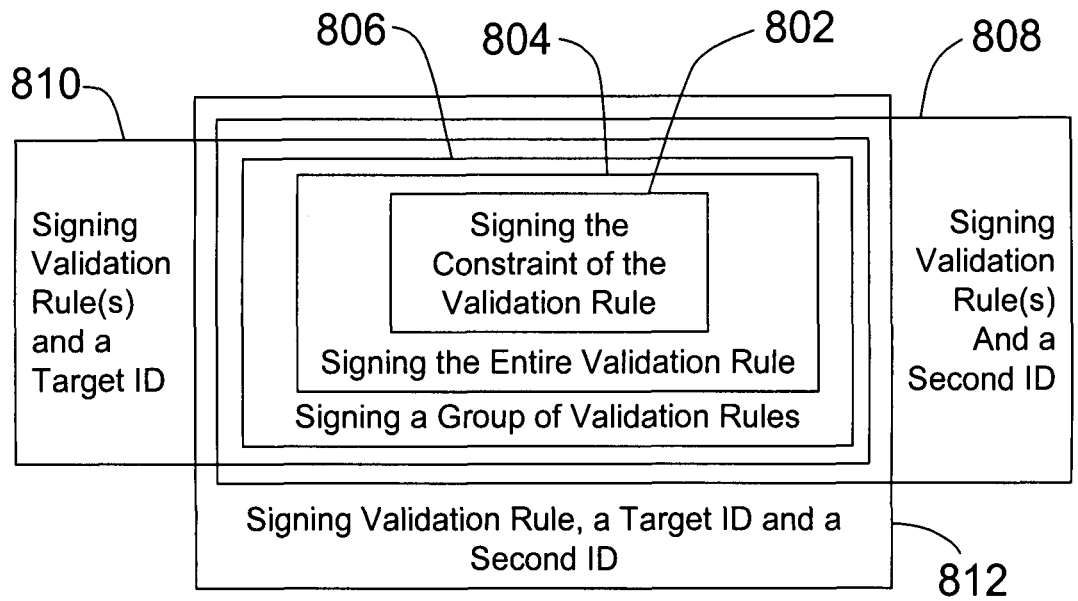

FIG. 6(a)-(e) illustrate examples of validation rules;

FIG. 7(A) shows components of a Web applications with different signed validation rule;

FIG. 7(B) illustrates the signing of validation rules in accordance with another embodiment of the present disclosure;

FIG. 8 shows steps of a method for hierarchical signing measures; and

Figure 9:
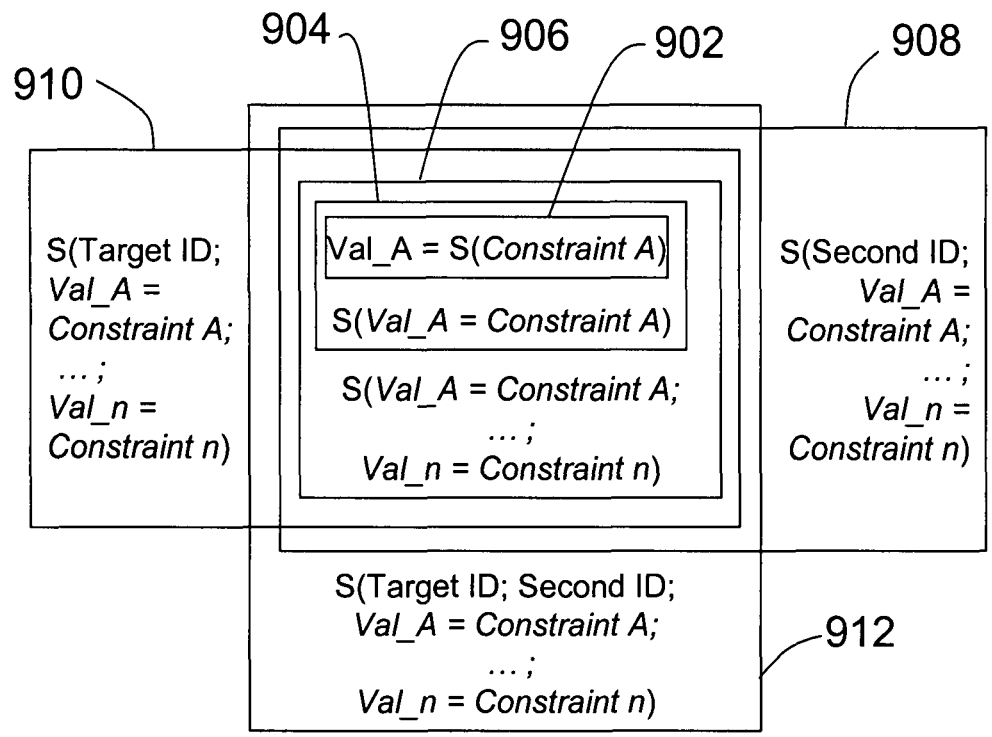

FIG. 9 shows examples of hierarchical signing measures.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to some specific embodiments of the disclosure including the best modes contemplated by the inventors for carrying out the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims. In the following description, numerous specific details are set forth in order to provide a thorough understanding of the present disclosure. The present disclosure may be practiced without some or all of these specific details. In other instances, well known process operations have not been described in detail in order not to unnecessarily obscure the present disclosure.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

Figure 1:
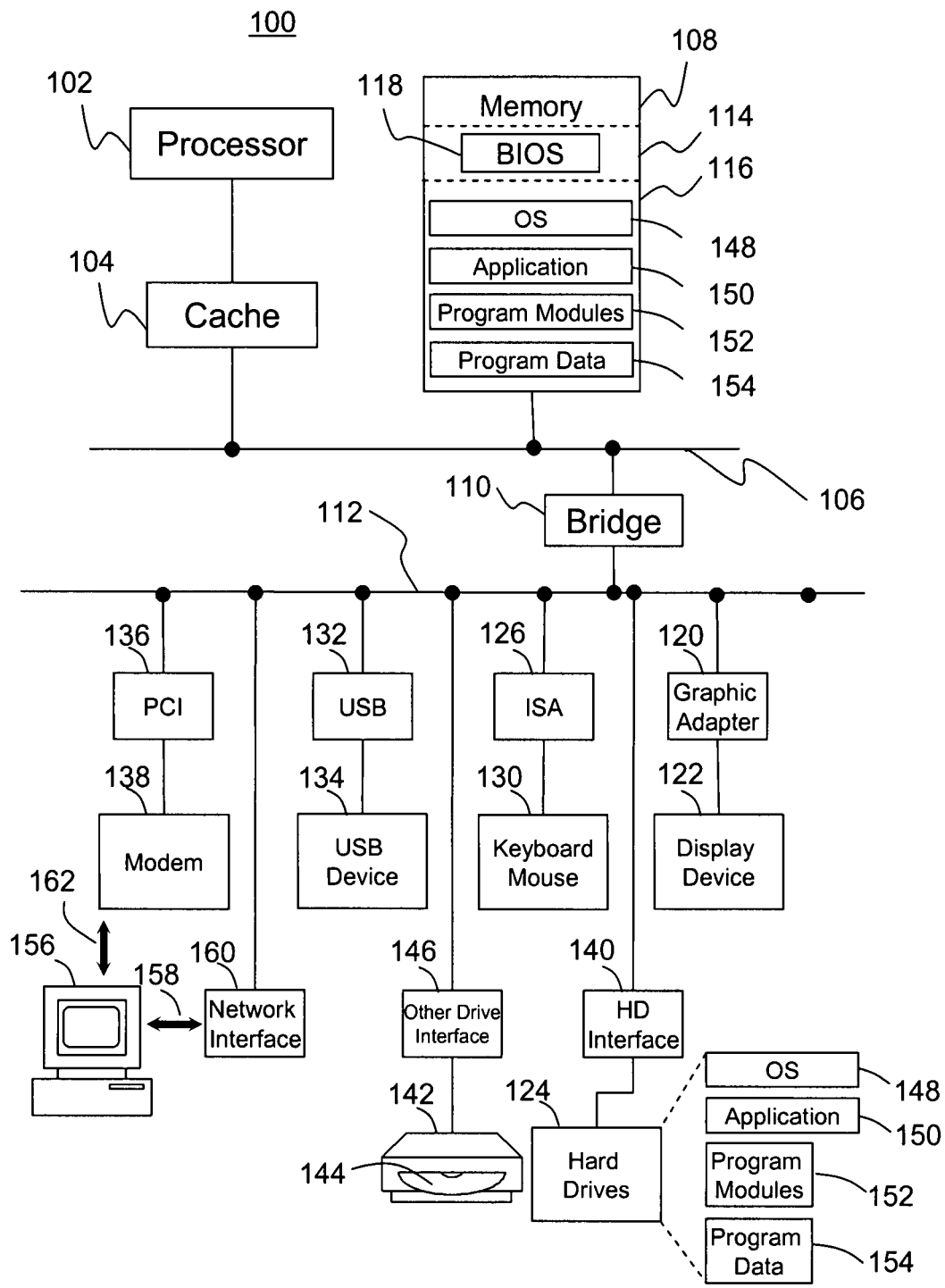
FIG. 1 shows a generic computing system in which the present disclosure may be implemented.

FIG. 1 and the following discussion are intended to provide a brief general description. FIG. 1 illustrates a block diagram of a suitable computing environment in which a preferred embodiment of the present disclosure may be implemented.

Those skilled in the art will appreciate that the disclosure may be practiced with many computer system configurations, including personal computers, hand-held devices, multi-processor systems, microprocessor-based or programmable consumer electronics, network PCs, minicomputers, mainframe computers and the like. The disclosure may also be practiced in distributed computing environments where tasks are performed by remote processing devices that are linked through a communications network. In a distributed computing environment, program modules may be located in both local and remote memory storage devices.

Although not required, the disclosure will be described in the general context of computer-executable instructions, such as program modules, being executed by a personal computer. Generally, program modules include routines, programs, objects, components, data structures and the like that perform particular tasks or implement particular abstract data types.

With reference to FIG. 1 an exemplary system 100 for implementing the disclosure may be, for example, one of the general purpose computers. The system 100 includes processor 102, which in the exemplary embodiment are each connected to cache memory 104, the cache 104 is connected in turn to a system bus 106 that couples various system components.

Also connected to system bus 106 are a system memory 108 and a host bridge 110. Host bridge 110 connects I/O bus 112 to system bus 106, relaying and/or transforming data transactions from one bus to the other. The system bus 106 and the I/O bus 112 may be any of several types of bus structures including a memory bus or memory controller, a peripheral bus, and a local bus using any of a variety of bus architectures. The system memory includes read-only memory (ROM) 114 and random access memory (RAM) 116. A basic input/output system 118 (BIOS), containing the basic routines that help to transfer information between elements within the personal computer 100, such as during start-up, is stored in ROM 114.

In the exemplary embodiment, the system 100 may further include a graphics adapter 120 connected to I/O bus 112, receiving user interface information for display device 122. A user may enter commands and information into the system 100 through input devices 130 such as a conventional mouse, a key board 130, or the like. Other input devices 134 may include a microphone, joystick, game pad, satellite dish, scanner or the like. The devices may be connected via an Industry Standard Architecture (ISA) bridge 126, or a Universal Serial Bus (USB) bridge 132 to I/O bus 112, respectively. PCI device such as a modem 138 may be connected to the I/O bus 112 via PCI bridge 136.

The exemplary system 100 may further include a hard disk drive 124 for reading from and writing to a hard disk, connected to the I/O bus via a hard disk interface 140, and an optical disk drive 142 for reading from or writing to a removable optical disk 144 such as a CD-ROM or other optical media. The hard disk drive 124, magnetic disk drive 28, and optical disk drive 142 may be connected to the I/O bus 112 by a hard disk drive interface 140, and an optical drive interface 146, respectively. The drives and their associated computer-readable media provide non-volatile storage of computer readable instructions, data structures, program modules and other data for the system 100. Although the exemplary environment described herein employs a hard disk 124 and a removable optical disk 144, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk 124, optical disk 144, ROM 118 or RAM 116, including an operating system 148, one or more application programs 150, other program modules 152 and program data 154.

The exemplary system 100 may operate in a networked environment using logical connections to one or more remote computers, such as a remote computer 156. The remote computer 156 may be another personal computer, a server, a router, a network PC, a peer device or other common network node, and typically includes many or all of the elements described above relative to the exemplary system 100. The logical connections depicted in FIG. 1 include a network 158, for example, a local area network (LAN) or a wide area network (WAN). Such networking environments are commonplace in offices, enterprise-wide computer networks, Intranets and the Internet.

When used in a networking environment, the exemplary system 100 is connected to the local network 158 through a network interface or adapter 160. The exemplary system 100 may use the modem 138 or other means for establishing communications 162 over a wide area network such as the Internet. In a networked environment, program modules depicted relative to the exemplary system 100, or portions thereof, may be stored in the remote memory storage device. It will be appreciated that the network connections shown are exemplary and other means of establishing a communications link between the computers may be used.

The exemplary embodiment shown in FIG. 1 is provided solely for the purposes of explaining the disclosure and those skilled in the art will recognize that numerous variations are possible, both in form and function. For instance, the exemplary system 100 may also include a magnetic disc drive, and numerous other optional components. All such variations are believed to be within the spirit and scope of the present disclosure. The exemplary system 100 and the exemplary figures below are provided solely as examples for the purposes of explanation and are not intended to imply architectural limitations. In fact, this method and system can be easily adapted for use on any programmable computer system, or network of systems, on which software applications can be executed.

Figure 2:
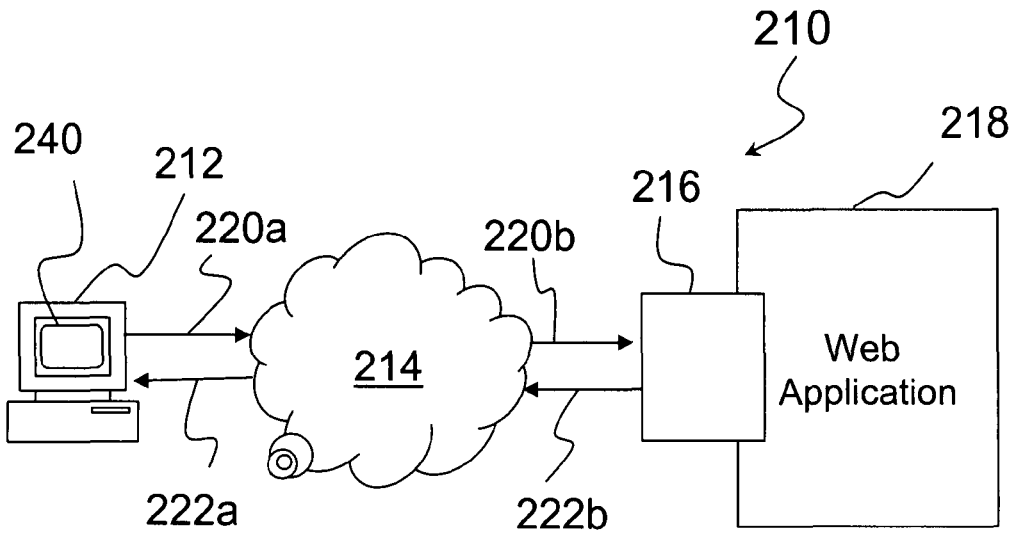
FIG. 2 shows a generic overview of a Web application environment.

FIG. 2 provides an overview of a network 210 with a Web application 218 and a Web client 240, for example but not limited to a Web browser, on a computer 212 over a public network 214 such as Internet. Optionally, there may be an entry point 216, for example, a validation engine, or an application firewall, separating the Web application 218 and the public network 214. A request 220 is generally intended to include a data flow from a Web client 240, for example but not limited to a Web browser, to a Web application 218. A response 222 is generally intended to include a data flow from a Web application 218 to a Web client 240, for example but not limited to a Web browser. One example of the Web applications 218 may be a business reporting engine.

Figure 3:
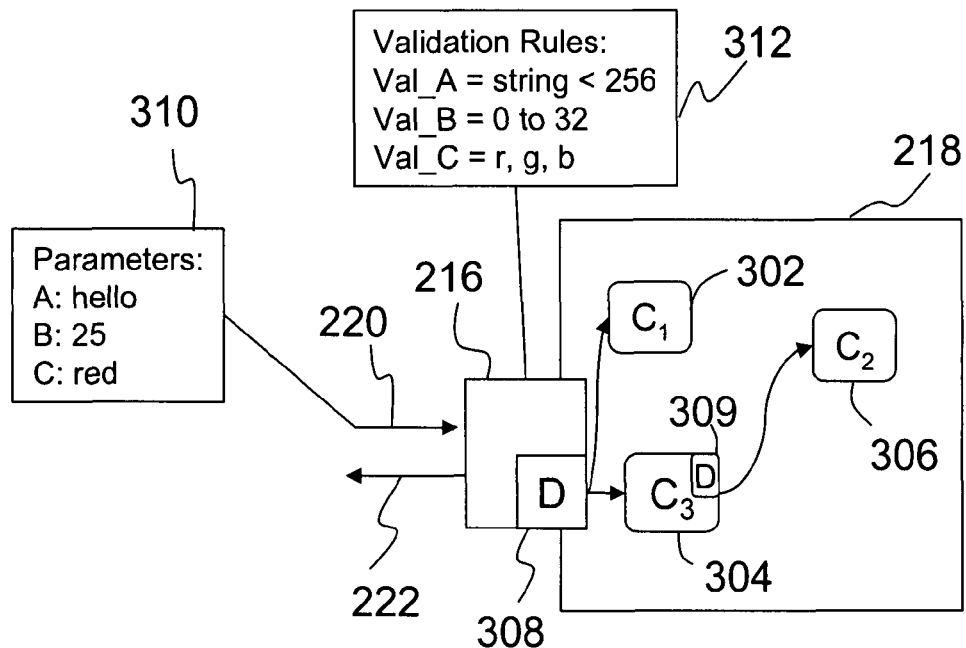
FIG. 3 shows a Web application environment with validation rules for parameters in a request.

FIG. 3 is a detailed view of a Web application 218. The Web application 218 may have one or more Web application components 302, 304 and 306. The optional entry point 216 may have a dispatcher 308 which may inspect an incoming request 222 and dispatch to a proper application component for example, component $C_1$ 302, component $C_2$ 306 via component $C_3$ 304. Component $C_3$ 304 may have a dispatcher functionality 309 for dispatching the request to component $C_2$ 306.

The following brief description of the validation rules is included to promote a better understanding of the principles of the present disclosure. Briefly, FIG. 3 shows an example of a request 220 which has the parameters 310: A as a string ("hello"), B as an integer ("25") and C ("red") as a color. A validation rule 312 resides in the entry point 216 validates the parameters in the request before passing the request 220 to the Web application 218, for example, Val_A is the validation rule for parameter A, Val_B is the validation rule for parameter B, and Val_C is the validation rule for parameter C, respectively.

Figure 4:
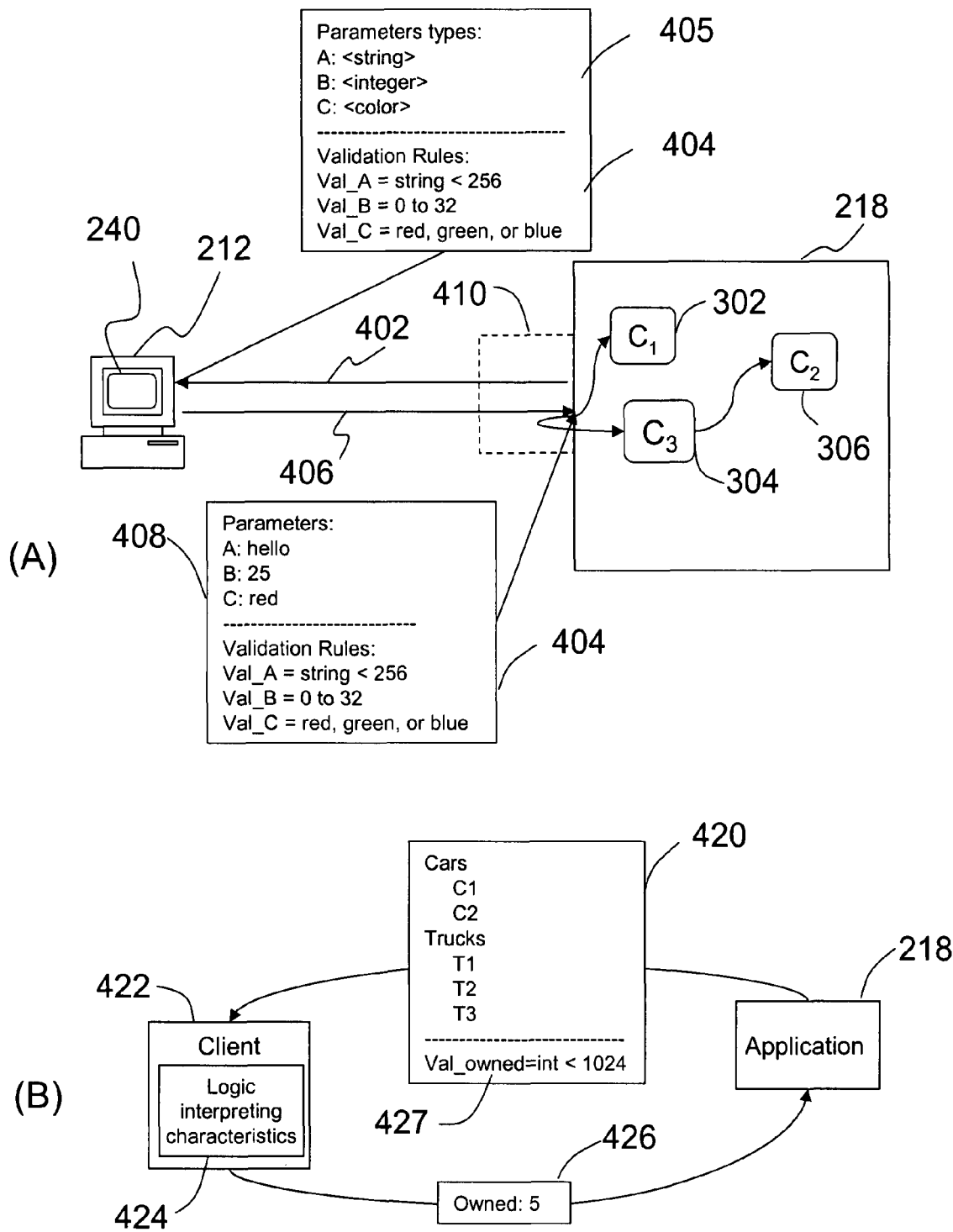
FIG. 4(A) shows an embodiment of the stateless validation.
FIG. 4(B) shows another embodiment of the stateless validation.

Referring to FIG. 4(A), according to one embodiment of the present disclosure, the stateless validation of the requests can be advantageously implemented by embedding the validation rules 404 into the response 402. The validation rules 404 match the parameter types 405 found in the response data such as <string>, <integer> or <color>. The subsequent request 406 from an untrusted client 212 will comprise both parameter with values 408 and the validation rules 404. The validation rules define the constraints of the parameter values, for example, "string smaller than 256 characters", "a number from 0 to 32", or "one of the color red, green, or blue". The Web application 218 on the server does not maintain a state regarding the validation, hence the validation of the rules is stateless with regard to the Web application 218. As the validation of the request 406 will be based on the embedded validation rules 404, either the individual Web application components or a centralized entity, for example a single entry point can therefore validate the parameters. When the validation rules are used in a distributed manner, one of a plurality of Web application components or, one of a plurality of entry points may perform the validation.

Referring to FIG. 4(B), the validation rules may apply to more than the parameters part of a response. The response with a validation rule sent from a server to a client may have a characteristic indicative of constraints to be applied to a subsequent request. The response 420 from the application 218 to the untrusted client 422 has the parameters Cars and Trucks. The term "untrusted client" is intended to include, but not limited to potentially malicious client. The validation rule in the response is to validate the number vehicles owned. The untrusted client 422 may be a rich client and has a prompting logic 424 interpreting the characteristics of the parameters. The ownership value is obtained from the user based on prompting client logic 424. The untrusted client 422 sends the ownership parameter and value back to the server in a request 426 where it will be validated according to rule 427.

Other characteristics in a request may include, but not limited to, an organization or a structure of the parameters. Once the response is received by an untrusted client, the client builds a subsequent request including the subsequent request data and the validation rule sent by the server. Therefore, the characteristic indicative of the constraints is a response primitive affecting the subsequent request data.

The untrusted client then sends the subsequent request to the server. The server validates the subsequent request data using the validation rule.

Because the user is not trusted it will be necessary in most circumstances to ensure the authenticity, and integrity of the validation rules. Digital signature is a cryptographically based signature assurance scheme which provides these functionalities.

Keyed-hash message authentication code (HMAC), is a hash based message authentication code (MAC) algorithm. The HMAC algorithm defines how a hash function and a key should be used to secure the authenticity and integrity of a message. To digitally signed the rules, HMAC is preferred over other cryptographic methods due to performance reasons. HMAC can be proven secure provided the underlying hash function has reasonable cryptographic strength. Any hash function can be used to compute HMAC, for example but not limited to, MD5, or SHA1.

Digitally signed messages may still be visible to a client, for example, the hash value of HMAC may be appended to the original message. Therefore, the original message is still visible, and in the case of the validation rules, still usable. This visibility of the digitally signed validation rules may be used by the client to ensure the correctness of the request prior to sending it to the server. The client may further instruct the user to provide correct input in the event that the correctness check results in a failure.

Figure 5:
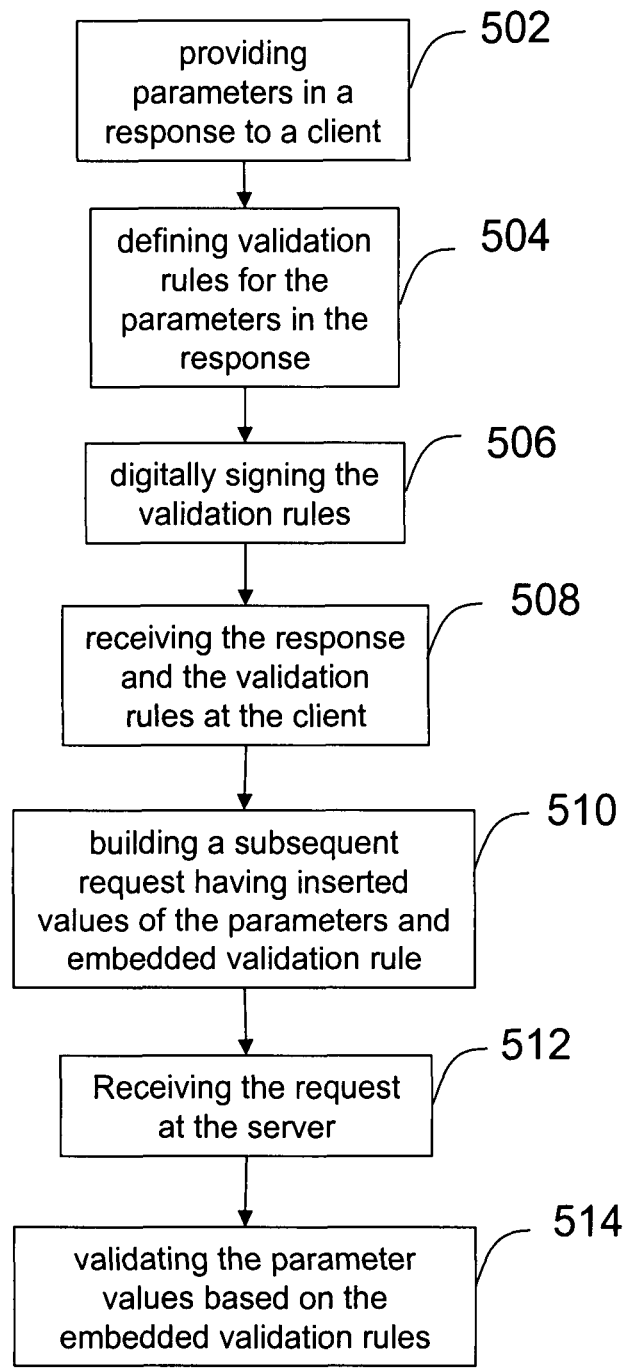
FIG. 5 shows the steps of the stateless validation.

Referring to FIG. 5, in accordance with one embodiment of the present disclosure a method for providing stateless validation using digital signature is provided. The Web application provides response with parameters to the client 502. The response also includes validation rules for the future values of the parameters 504. The validation rules are digitally signed to ensure the integrity and authenticity of the validation rules 506. The digital signature may be performed, for example, using HMAC. The response with the embedded validation rules is received by the client 508. When the parameter with its name and value, and the embedded validation rules are returned in the subsequent request 510, and received at the Web server 512, the values in the request can be validated independently 514. The entry point, for example an application firewall, or a recipient Web application component can perform the validation.

Figure 6:
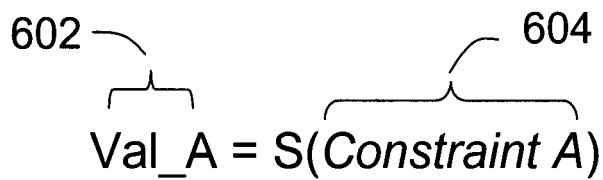

In its simplest form as illustrated in FIG. 6(*a*), the validation rule can be considered to include two basic elements, the data context 602 and the constraint 604. The data context indicates which parameter will have its value verified. For example, VAL_A specifies validation for the parameter A. The constraint can be signed in a form S(Constraint A). "S( )" denotes that the elements inside the bracket are digitally signed. The constraint 604 may be, for example, that the parameter A value is a string of less than 256 characters. Therefore the signed validation rule for parameter A may be presented as in FIG. 6(*b*). However, simply signing the constraint allows a potential attacker to interchange signed constraints S(string<256) between parameter contexts without tampering with the signed constraints. For example, the signed constraint for VAL_A could be substitute with a S(boolean) constraint defined for an other parameter I believe we are ok here, no illustration needed).

This disadvantage may be overcome by signing the combination of parameter context and constraint as illustrated in FIGS. 6(*c*) and 6(*d*). Here the whole validation rule is signed; therefore an attacker is unable to exchange part of the rules as in the case of FIGS. 6(*a*) and (*b*). The signing limits the usage context of a constraint to the specific parameter for which it is signed with. However, this may still be prone to other kinds of attacks as will be described below in FIG. 7(*a*).

FIG. 7(A) shows two components 702, 704, of a Web application, each has a respective signed validation rule 706, 708, which is sent to and received from the client 240. 706 has the signed validation rules S(Val_A=string<256) and S(Val_B=0 to 32), applicable for the request designated to Component A 702. 708 has the signed validation rules S(Val_A=string<256) and S(Val_B=string<256), applicable for the request designated to component B 704. A malicious user could swap the signed validation rule 708 for signed validation rule 706, and insert a string into the numerical value for component A, bypassing the validation rule Val_B=0 to 32, and thus launch an attack.

This kind of attack can be prevented either by having a different signing key in each component or by factoring in a target ID for the destined application, as shown below in FIGS. 8 and 9. In practice, managing multiple signing keys within an application may not be practical. Having to manage different keys for each component of an application would be burdensome to implement. On the other hand, Web applications commonly have component identifiers which can be used as target IDs.

Therefore, referring to FIG. 6(*e*) and FIG. 7(B), adding a target ID 710 to the rule is one of the preferred solutions. The target ID is a unique value associated with each component 702, 704 of an application 218. The rule signature process includes the component target ID to restrict usage of the signed rule to the specific component. The component 702, 704, or the entry point 410, verifying the data and the rule signatures must ensure that the validated data is only dispatched to a component with a matching target ID.

Similarly, referring to FIG. 6(*f*) and FIG. 7(B), other IDs may be included in the signed validation rules to prevent other attack types. For example, a user session ID may be included in the signed validation rules 712 to identify the user session in an application where a response is originated, thus preventing the use of signed validation rules from another user session. A signed rule for user A cannot be used for user B because they have different session ID.

In accordance with another embodiment of the present disclosure there is provided a hierarchical signing measures in the communication of validation rules between a Web client and a Web application. These hierarchical signing measures include the signing of the primitive of the validation rules; signing of the entire validation rule; singing of a group of validation rules for the parameters in the request; the inclusion of a group of validation rules with a target ID for signing and signing of a group of validation rules with a second ID, for example, a session ID. FIGS. 8 and 9 illustrate the hierarchical signing measures, wherein FIG. 8 shows an exemplary embodiment of the different hierarchical signing measures with general increasing security; and FIG. 9 shows examples of corresponding validation rules.

Referring to FIGS. 8 and 9, a validation rules may have only its constraint signed 802, 902. By way of example only, this signing may be in the form of "S(String<256)" part of the validation rule. This signing may provide sufficient authenticity and integrity.

Next level of signing 804, 904 is to sign a single, entire validation rule, for example, S(Val_A=String<256) is signed entirely. This signing will prevent a swapping of the signed constraints between the parameters. This level will be sufficient for many applications.

As depicted by 806 and 906, another stage of signing can be implemented whereby a group of validation rules for the parameters of a request are signed together. Signing groups of rules allows for different validation rules for parameters with the same name as long as they are in a different group.

To prevent group substitution, the component receiving parameters must ensure that the rule group has one rule for every parameter it consumes in a given usage context, and only one rule. For example, if a group of three rules Z, X, and Y require Y to be a string, a different group X and Y could require Y to be an integer. When a component consumes X, and Y, it will ensure there are only rules for X, Y in the group and validate Y as an integer. Trying to use the group Z, X, Y for the same component consumption will fail because the Z rule would not be used.

Steps 808 and 908 represent yet another stage of signing whereby validation rules are signed together with a second ID, for example a session ID.

Steps 810 and 910 represent another stage of signing whereby validation rules are signed together with a target ID. The target ID and a second ID, for example, the session ID may further be signed together with the validation rules as illustrated in 812 and 912.

As will be readily understood by a person skilled in the art, terms "signing" "signed" and "signature" in the above and accompanying figures are intended to include both symmetric and asymmetric algorithms, for example but not limited to cryptographic hash functions, HMACs, or private public key signatures.

The disclosure can be implemented in digital electronic circuitry, or in computer hardware, firmware, software, or in combinations thereof. Apparatus of the disclosure can be implemented in a computer program product tangibly embodied in a machine-readable storage device for execution by a programmable processor; and method actions can be performed by a programmable processor executing a program of instructions to perform functions of the disclosure by operating on input data and generating output. The disclosure can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The present disclosure has been described with regard to one or more embodiments. However, it will be apparent to persons skilled in the art that a number of variations and modifications can be made without departing from the scope of the disclosure as defined in the claims.

What is claimed is:

1. A method of validating request data transmitted between an untrusted client and a server based on characteristics of a previous response comprising:
   receiving the request data from the untrusted client;
   building a response with a validation rule, the response having a characteristic indicative of a constraint to be applied to subsequent request data, the validation rule including the constraint;
   sending the response to the untrusted client;
   receiving a subsequent request that includes the subsequent request data and the validation rule; and
   validating the subsequent request data using the validation rule.

2. The method as claimed in claim 1, wherein the characteristic is a response primitive affecting the subsequent request data.

3. The method as claimed in claim 2, wherein the response primitive is a parameter.

4. The method as claimed in claim 2, wherein the response primitive is a structure of a plurality of parameters.

5. The method as claimed in claim 1, wherein the request has a parameter, and a validation rule corresponding to the parameter.

6. The method as claimed in claim 1, wherein the response and the subsequent request further comprise a target ID.

7. The method as claimed in claim 1, wherein the response and the subsequent request further comprise a session ID.

8. The method as claimed in claim 1, further comprising: digitally signing one member selected form the group consisting of: the constraints in the validation rule, the validation rule, the plurality of validation rules, the plurality of validation rules with target ID, the plurality of validation rules with session ID, and a combination thereof.

9. The method as claimed in claim 8 wherein a keyed hash message authentication code (HMAC) is used to digitally sign the one member.

10. The method as claimed in claim 8 wherein a public private key signature is used to digitally sign the one member.

11. The method as claimed in claim 1, further comprising: ensuring the correctness of the subsequent request at the untrusted client using the validation rule.

12. A system of validating request data transmitted between an untrusted client and a server based on characteristics of a previous response comprising:
   a processor that
      receives the request data from the untrusted client,
      builds a response with a validation rule, the response having a characteristic indicative of constraints to be applied to subsequent request data, the validation rule including the constraints,
      sends the response to the untrusted client, and
      receives a subsequent request from the untrusted client, the subsequent request including the subsequent request data and the validation rule; and
   a validation engine that validates the subsequent request data using the validation rule.

13. A storage medium readable by a computer encoding a computer program for execution by the computer to carry out a method for validating request data transmitted between an untrusted client and a server based on characteristics of a previous response comprising:
   receiving the request data from the untrusted client;
   building a response with a validation rule, the response having a characteristic indicative of constraints to be applied to subsequent request data, the validation rule including the constraints;
   sending response the untrusted client;
   receiving a subsequent request that includes the subsequent request data and the validation rule; and
   validating the subsequent request data using the validation rule.

14. The storage medium as claimed in claim 13, wherein the characteristic is a response primitive affecting the subsequent request data.

15. The storage medium as claimed in claim 14, wherein the response primitive is a parameter.

16. The storage medium as claimed in claim 14, wherein the response primitive is a structure of a plurality of parameters.

17. The storage medium as claimed in claim 13, wherein the request has a parameter, and a validation rule corresponding to the parameter.

18. The system as claimed in claim 12, wherein the characteristic is a response primitive affecting the subsequent request data.

19. The system as claimed in claim 18, wherein the response primitive is a parameter.

20. The system as claimed in claim 18, wherein the response primitive is a structure of a plurality of parameters.

* * * * *